March 28, 1950 A. J. STROZINSKI 2,502,395
ENGINE STARTER DRIVE
Filed July 30, 1948
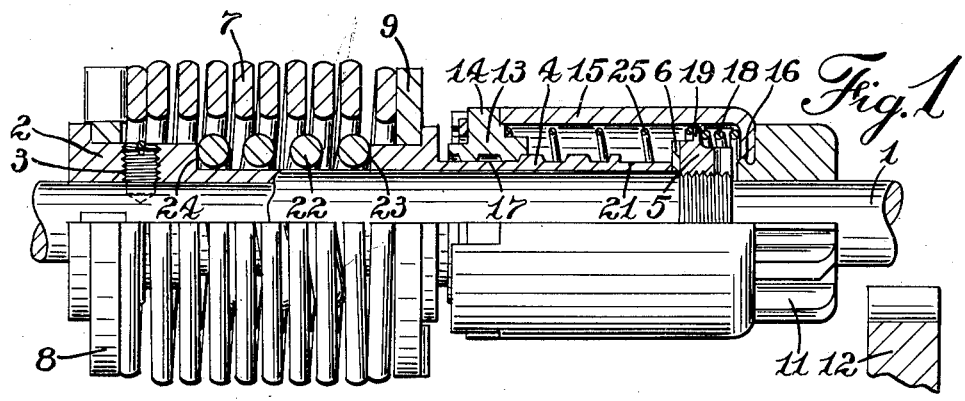
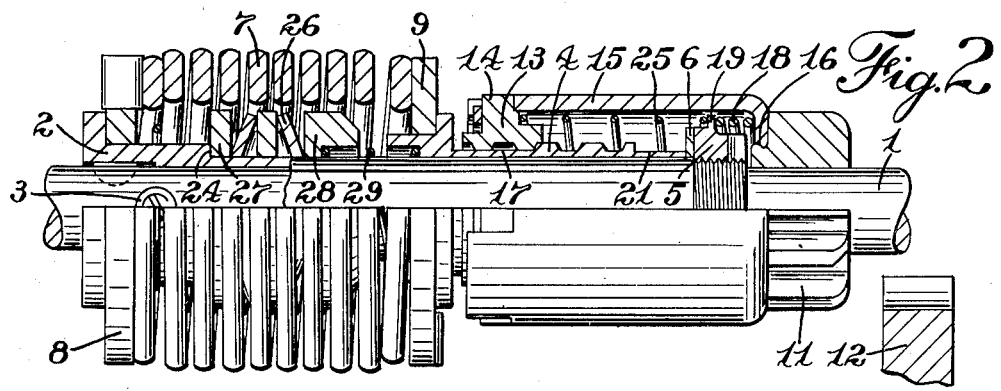
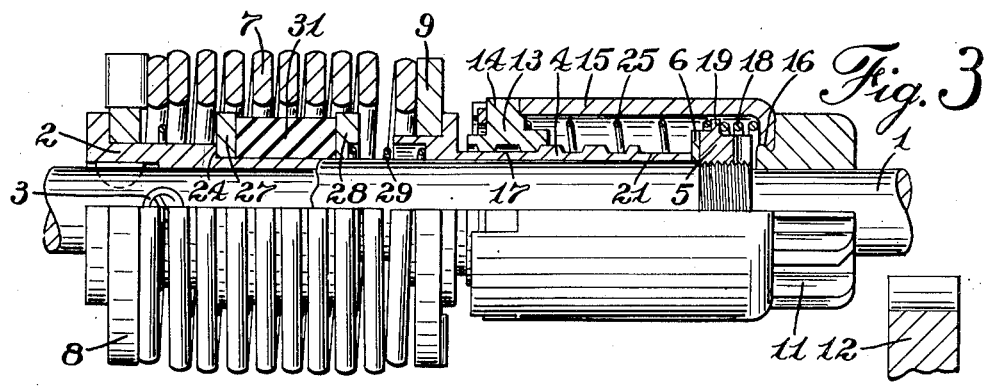
INVENTOR.
Anthony J. Strozinski
BY
Clinton S. Janes
ATTORNEY
WITNESS:
Esther M. Stockton Patented Mar. 28, 1950

2,502,395

UNITED STATES PATENT OFFICE 2,502,395

ENGINE STARTER DRIVE

Anthony J. Strozinski, Elmira Heights, N. Y., assignor to Bendix Aviation Corporation, a corporation of Delaware Application July 30, 1948, Serial No. 41,458

2 Claims. (Cl. 74—7)

1

The present invention relates to an engine starter drive, and more particularly to starter gearing which is adapted to release when overloaded.

It is an object of the present invention to provide a novel drive of this character which is simple in construction and involves few changes to incorporate the overload release in standard types of drive.

It is another object to provide such a device in which the over-running of the starting motor when the predetermined load is exceeded, is opposed by both a wedging or camming action and a frictional resistance so as to dampen and cushion the action.

It is another object to provide such a device in which further yielding means are provided to cushion the engagement of the gearing and insure proper mesh thereof.

Further objects and advantages will be apparent from the following description taken in connection with the accompanying drawing in which:

Fig. 1 is a side elevation partly broken away and in section of a preferred embodiment of the invention;

Fig. 2 is a similar view of a second embodiment of the invention; and

Fig. 3 is a similar view of a third embodiment of the invention.

In Fig. 1 of the drawing there is illustrated a power shaft 1 on which a sleeve 2 is rigidly anchored as indicated at 3. A screw shaft 4 is slidably journalled on the sleeve 2, being confined thereon by a stop nut 5 fixed on the end of said sleeve, a thrust washer 6 being preferably interposed between the end of the screw shaft and the top nut. Means for actuating the screw shaft 4 from sleeve 2 is provided comprising a drive spring 7 anchored at one end to said sleeve by means of an anchor plate 8 and at its other end to the screw shaft by means of an anchor plate 9.

A pinion 11 is slidably journalled on the power shaft 1 for movement into and out of mesh with an engine gear 12, and means for actuating the pinion from the screw shaft 4 is provided including a control nut 13 which is keyed as indicated at 14 to one end of a barrel 15, the opposite end of which is rigidly connected to the pinion 11 as shown at 16.

The screw shaft 4 is formed with a smooth portion 17 adjacent the idle position of the control nut, and means for insuring entry of the control nut upon the threads of the screw shaft is pro-

2 vided in the form of a reentry spring 18 located within the barrel 15 between the end of the barrel which is fixed to the pinion and a flange 19 on the stop nut 5. The cranking position of the pinion and control nut is defined by the engagement of the control nut against the thrust washer 6, so that when the cranking torque is transmitted through the drive, the screw-jack action of the screw shaft 4 and control nut 13 causes the screw shaft to move to the left, thus compressing the drive spring 7.

In order to provide a release of the driving connection when a predetermined cranking torque is exceeded, the screw shaft 4 is provided with a second smooth portion 21 adjacent the stop nut 5 whereby the control nut may run off the ends of the threads of the screw shaft 4 when an overload is encountered. Means for opposing the longitudinal movement of the screw shaft 4 in order to control this overload release is provided in the form of a heavy compression spring 22 located between the end 23 of the screw shaft 4 and a shoulder 24 on the sleeve 2. This compression spring is so designed in relation to the pitch of the screw shaft 4, that the control nut 13 may run off the ends of the threads of the screw shaft when the predetermined maximum torque is exceeded.

In operation, the rotation of the power shaft 1 is transmitted through sleeve 2 and drive spring 7 to the screw shaft 4 causing traversal of the control nut 13 which moves the pinion 11 into mesh with the engine gear 12, whereupon such longitudinal movement is arrested by the stop nut 5. Further rotation of the power shaft 1 causes cranking torque to be transmitted to the engine gear, which torque is cushioned both by the winding up of the drive spring 7 and by the longitudinal movement of the screw shaft 4 away from the stop nut 5 by the screw-jack action of the screw shaft and control nut.

If, due to backfire or other reasons, the predetermined maximum torque is exceeded, the screw shaft 4 compresses the springs 22 and 7 sufficiently to permit the control nut 13 to run off the ends of the threads of the screw shaft, which action continues until the excess torque is dissipated. Cranking is then resumed in the usual manner, and when the engine starts, the acceleration of the pinion 11 causes the control nut 13 to thread itself back to idle position where it is normally retained by an anti-drift spring 25.

In Fig. 2 of the drawing the parts of the drive are the same as in the first embodiment described, and are similarly numbered, except for the yielding means resisting longitudinal movement of the screw shaft 4. As here illustrated, this means is in the form of a plurality of spring washers 26 interposed between a thrust washer 27 bearing against the shoulder 24 of sleeve 2, and an abutment member 28 slidably mounted on the sleeve 2 between said spring washers and the end of the screw shaft 4. A light compression spring 29 is preferably located between the abutment member 28 and the screw shaft 4 to prevent looseness of the parts and to cooperate with the drive spring 7 in providing a light yielding cushion for the screw shaft to assist the pinion 11 to enter into mesh with the engine gear 12.

In the operation of this embodiment of the invention, when the power shaft 1 is rotated to move the pinion 11 into mesh, if a tooth of the pinion should abut against a tooth of the engine gear 12, the screw shaft 4 moves backward, compressing the drive spring 7 and the meshing spring 29 until sufficient torque is built up to cause the pinion to be indexed into proper registry with the tooth spaces of the engine gear, whereupon the pinion is snapped into mesh with the engine gear. During cranking the screw shaft is pressed against the abutment member 28 by the screw-jack action of the screw shaft and control nut, and if the predetermined cranking load is exceeded, the spring washers 26 will yield sufficiently to permit the control nut 13 to run off the ends of the threads of the screw shaft. Inasmuch as the longitudinal pressure required to compress the discs 26 decreases as the discs are flattened out, it will be appreciated that the endwise pressure of the ends of the threads of the screw shaft against the threads of the control nut will be considerably reduced during the overrunning action so as to reduce noise and wear of the parts.

In Fig. 3 of the drawing the general arrangement is the same as in Fig. 2 and the parts are similarly numbered, except that a block 31 of elastically deformable material such as rubber is substituted for the spring discs 26 illustrated in Fig. 2. The rubber block, in addition to its cushioning function, acts as an additional frictional connection between the sleeve 2 and screw shaft 4, thus damping torsional vibrations and assisting in reducing noise and shock to the drive.

Although certain embodiments of the invention have been shown and described in detail, it will be understood that other embodiments are possible and various changes may be made in the design and arrangement of the parts without departing from the spirit of the invention.

I claim:

1. In an engine starter drive a power shaft, a screw shaft slidably and rotatably mounted thereon, a nut threaded on the screw shaft, a pinion slidably journalled on the power shaft for longitudinal movement into and out of mesh with a gear of an engine to be started, means connecting the pinion for rotation and longitudinal movement with the nut, stop means limiting longitudinal movement of the screw shaft and the nut to thereby define the meshed position of the pinion, yielding means connecting the screw shaft for rotation with the power shaft and yielding means resisting longitudinal movement of the screw shaft away from the stop means, said screw shaft having a smooth portion adjacent the stop means which permits the screw shaft to rotate without rotating the nut after the screw shaft has moved a predetermined distance away from the stop means.

2. An engine starter drive as set forth in claim 1 in which the yielding means resisting longitudinal movement of the screw shaft away from the stop means includes a light compression spring for resisting such initial longitudinal movement of the screw shaft to assist the pinion to enter into mesh with the engine gear, and means including a heavy compression spring resisting further such longitudinal movement of the screw shaft.

ANTHONY J. STROZINSKI.

REFERENCES CITED

The following references are of record in the file of this patent:

UNITED STATES PATENTS

| Number | Name | Date |
|--------|------|------|
| 2,423,063 | Buxton | June 24, 1947 |